United States Patent [19]

Larson

[11] Patent Number: 4,767,030

[45] Date of Patent: Aug. 30, 1988

[54] PARTICULATE FOOD DEPOSITOR

[75] Inventor: James A. Larson, Duluth, Minn.

[73] Assignee: The Pillsbury Company, Minneapolis, Minn.

[21] Appl. No.: 121,691

[22] Filed: Nov. 16, 1987

[51] Int. Cl.$^4$ .............. B29C 47/00; B05C 19/00
[52] U.S. Cl. .............................. 222/238; 118/24; 118/308; 425/331; 425/376 R; 425/DIG. 230
[58] Field of Search .............. 222/238; 425/376 R, 425/331, DIG. 230; 118/16, 24, 25, 308, 309, 310

[56] References Cited

U.S. PATENT DOCUMENTS

| | | | |
|---|---|---|---|
| 993,815 | 5/1911 | Beardsley | 222/238 |
| 2,594,683 | 4/1952 | Scott | 222/238 |
| 2,703,193 | 3/1955 | Seltzer | 222/238 |
| 3,164,490 | 1/1965 | Evanson et al. | 118/25 |
| 3,283,740 | 11/1966 | Fredricksen | 118/24 |
| 3,885,519 | 5/1975 | Orlowski | 118/16 |
| 4,044,714 | 8/1977 | Jones et al. | 118/24 |
| 4,245,581 | 1/1981 | Spencer | 118/24 |

Primary Examiner—Willard Hoag
Attorney, Agent, or Firm—Robert J. Lewis

[57] ABSTRACT

A depositor is provided for the feeding or distribution of particulate food pieces, as for example, raisins, nutmeats, etc. The depositor includes a pair of superposed screws positioned in a hopper over an outlet screen member. By oscillating rotational movement of the screws, the particulates are fed from the hopper through the screen onto a dough sheet or the like under the depositor.

8 Claims, 4 Drawing Sheets

PARTICULATE FOOD DEPOSITOR

FIELD OF THE INVENTION

The present invention relates to an apparatus and method for depositing particulate food items.

BACKGROUND OF THE INVENTION

There has long been a need in the baking industry for a depositor which will uniformly distribute particulates, particularly raisins. Distribution should be uniform both in weight per time and across the material onto which the particulates are deposited, for example, a dough sheet.

With particular reference to raisins, raisins have been problematic in their depositing. Three types of depositors have been used, those are vibratory feeders, for example, those made by Sintrum Co., screw feeders, for example, those made by Moline, paste spreaders and oscillating screens. These types of feeders have required that the raisins first be washed and then coated with a dry powder material to reduce stickiness. Even with such additional expensive and time-consuming processing, these types of feeders have been irregular or non-uniform in depositing and have caused damage to the raisins which are relatively soft and easily damaged by cutting or mashing. If the raisins are not pre-processed prior to distribution, the problems of distribution and damage are worse.

It has long been a desire in the baking industry to be able to accurately deposit raisins and other food particulates accurately and without damage to them.

The present invention provides means for depositing in a simple and inexpensive manner, from a machine standpoint, and also reduces the need for pre-processing of sticky particulates such as raisins. It was found that when using the present invention that raisins need only be washed prior to depositing and that the depositing with the present invention provided more uniform distribution both by weight per unit of time and uniformity across the width of the material being deposited upon.

In the baking industry either a sheet of dough or dough pre-forms, for example, pre-formed rolls, have raisins deposited thereon as they move under a depositor. A dough sheet with deposited raisins can be further processed, for example, laminated, and then formed into pre-forms for subsequent cooking. The pre-forms with raisins thereon are typically ready for cooking after the depositing. Further, particulates can be deposited on a bakery item after the bakery item is cooked. Because of the variety of positions at which the depositing can take place, it has long been a desire to provide a depositor that was easily portable to various positions on the processing line. The present invention also solves this problem.

Surprisingly, it was found that the present invention not only worked well with soft particulates, for example, raisins, but that it was also effective with numerous other particulate materials, for example, hard particulates like nutmeats or nutmeat portions, fragile particulates, for example, sliced almonds and streusel and non-uniformly sized particulates. The invention can also be used on fine particulates, for example, flours and cereal-grained meals and sugar.

It is an object of the present invention to provide a depositor which will uniformly deposit soft particulates like raisins.

It is another object of the present invention to provide a depositor which will handle a large variety of particulate materials.

It is another object of the present invention to provide a depositor which will handle fragile or easily damaged particulates with minimal damage thereto during depositing.

It is another object of the present invention to provide a depositor which is easily changed to accommodate different materials.

It is another object of the present invention to provide a depositor which is portable and adapted for movement to various positions on a processing line.

It is a still further object of the present invention to provide a depositor which overcomes the above discussed problems in the baking industry.

It is a still further object of the present invention to provide a depositor which is simple in construction and easy to manufacture and maintain.

FIGURES

FIG. 1 is a side elevation view of the depositor.
FIG. 2 is a side elevation view of the drive means.
FIG. 3 is a sectional view along line 3—3 of FIG. 1.
FIG. 4 is an end elevational section taken along the line 4—4 of FIG. 1.
FIG. 5 is a schematic diagram of the air control system for the drive means.
FIG. 6 is a schematic diagram of the electrical control system.

DETAILED DESCRIPTION

Figure 1:
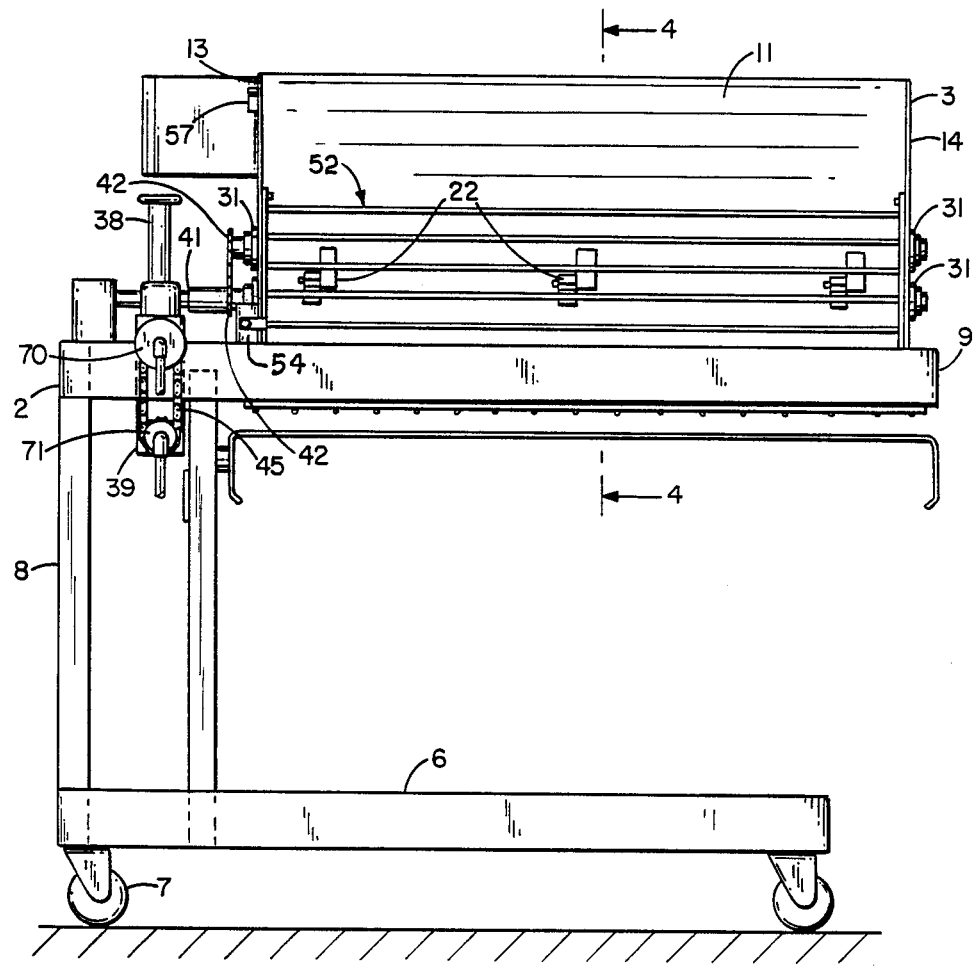
Figure 2:
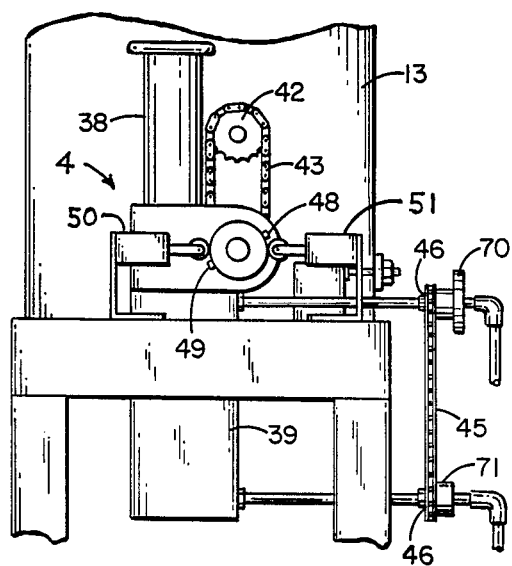
Figure 3:
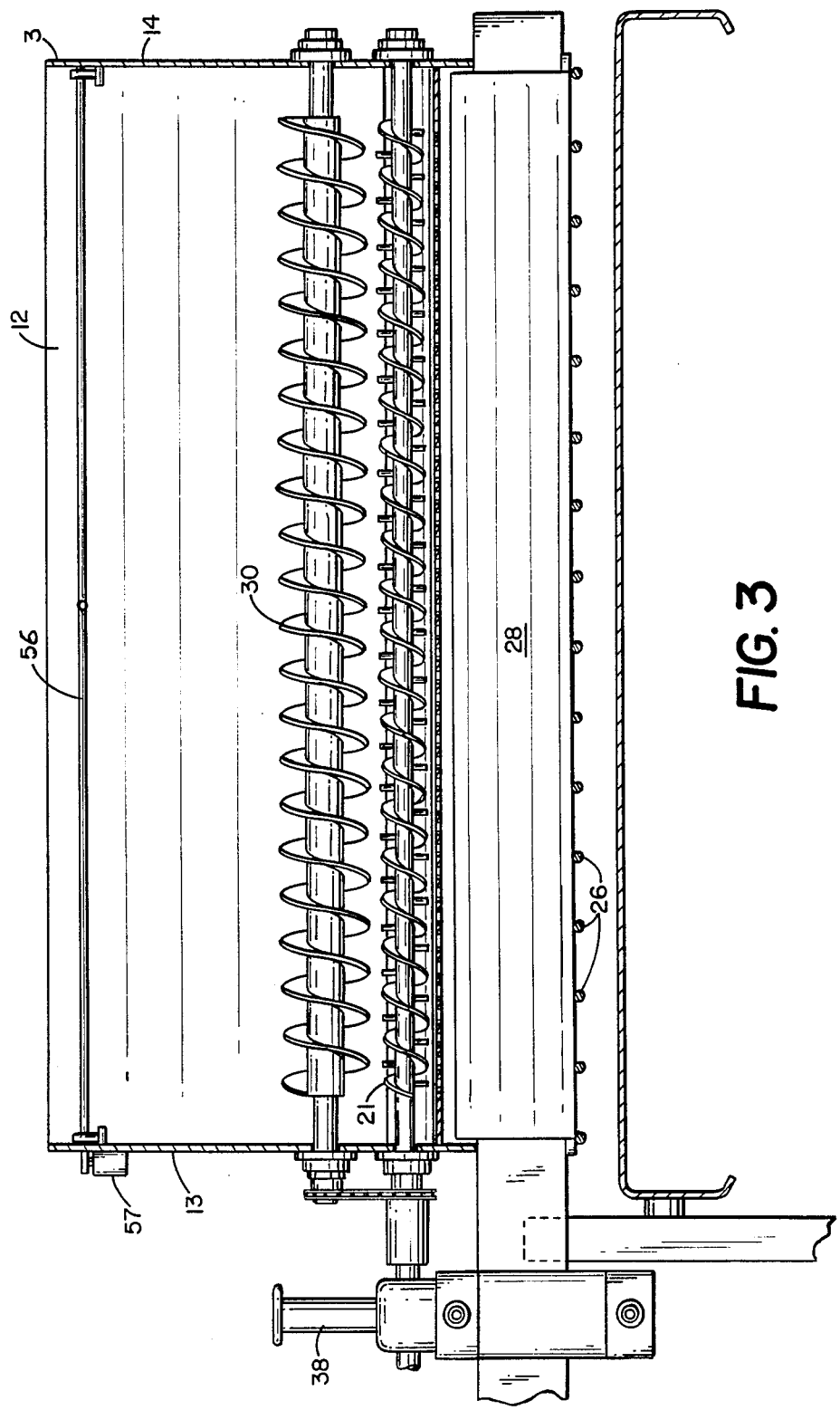
Figure 4:
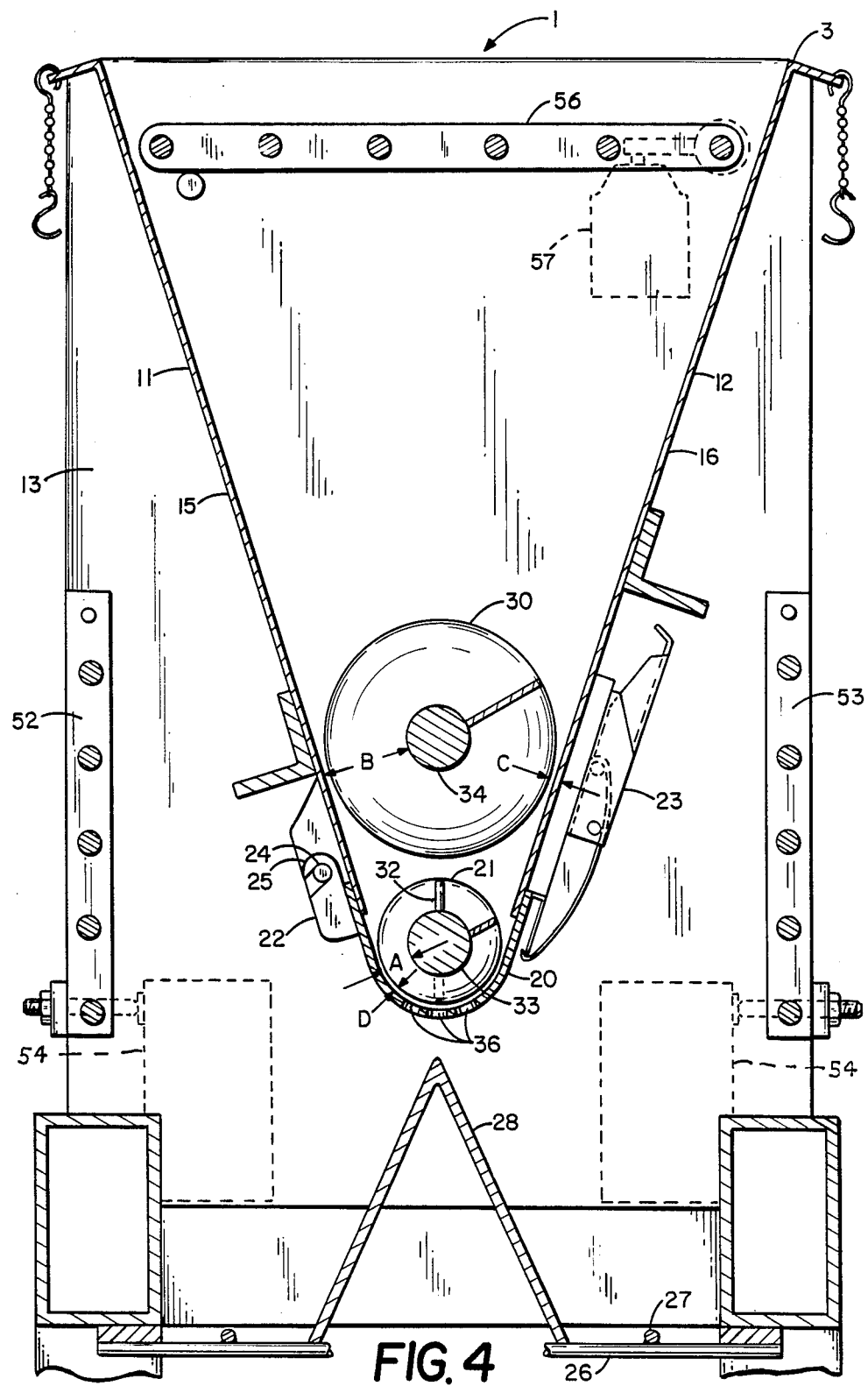

The reference number 1 designates generally a particular depositor which includes a support framework 2 having mounted thereon hopper means 3. The reference numeral 4 designates generally the drive means which is operable for driving portions of the hopper feed means 3.

The support framework is generally U-shaped comprising bottom framework 6 having mounted thereon wheels 7. Secured to the bottom 6 is an upstanding frame portion 8 which has mounted thereon the drive means 4. A top frame member 9 is secured to the upstanding frame 8 and has the hopper feed means 3 mounted thereon. By being U-shaped, the depositor 1 can be easily moved into position on a processing line permitting the bottom frame to be positioned beneath a portion of the line and the top frame is positioned above the processing line. When the depositor is used for food depositing, it is preferred that all the materials be acceptable for use in a food plant and is typically stainless steel.

The hopper feed means 3 includes an elongate hopper comprising side wall members 11 and 12 and end wall members 13 and 14. The end walls are generally parallel. The side walls can assume any desired shape and dimensions and preferably are shaped so as to prevent bridging and plugging during operation of the depositor. In the particular form shown, the side walls have upper portions 15 and 16 which are both angled relative to vertical with the included angle therebetween being in the range of between about 25° and about 40° total included angle. It has been found particularly desirable for raisins to have an included angle of approximately 36°.

The end walls 13 and 14 and the side walls 11 and 12 are secured together in any suitable manner, as for example, by welding.

A perforate or screen member 20 is suitably removably mounted on the hopper 3. Preferably, the screen 20 is mounted in a manner such that it can be easily removed for cleaning or changing. It is preferred that the screen have a round contour in cross section and it should generally match the contour of the lower positioned screw 21. The screen extends the length of the side walls 11 and 12 and is mounted thereon by hinges 22 and is secured in position by toggle latches 23. Preferably, the hinges 22 are of a kind that includes a pin 24 mounted on the side wall 11 and the screen 20 has slotted members 25 secured thereto such that after a certain amount of rotation thereof the hinge slot is in a position that the slotted member 25 can be disengaged from the pins 24.

It is preferred that the screen be imperforate at each end for a length approximately equal to one flight of the lower screw 21, to provide a non-feed area for the particulate material in the hopper 3.

Secured to the top frame 9 are support bars 26 and 27 which are positioned under the hopper means 3 and form a grid. It is desired to provide a deflector 28 which is generally V-shaped and extends the approximate length of the side walls 11 and 12. In operation, deflector 28 has the apex of the V pointing upwardly providing a diverging deflector with respect to particulate movement downwardly thereover. It has been found that the deflector helps provide uniformity of distribution of the particulates and also functions as an accumulator reducing the effect of the dead time during the reversal of the rotation oscillation of the screws in the hopper means 3. The deflector 28 can be loosely positioned under the hopper or can be permanently affixed thereunder.

In a preferred embodiment of the present invention, the plurality of screws are mounted in the hopper feed means 3. As shown, two screws in superposed relation are provided. The screws 21 and 30 are suitably rotatably mounted in the hopper means 3, as for example, by bearings 31 secured to the end walls 13 and 14. The screws 21 and 30 are generally parallel to the side walls 11 and 12 with the lower screw 21 being positioned between the lower portions of the side walls 11 and 12 while the upper screw is mounted thereabove and being in superposed relation. The axis of the screw 30 is generally vertically above the axis of the screw 21. As shown the lower screw 21 can have a plurality of radially projecting pins 32, e.g., between every flight and extending in generally radially opposite directions. If desired both screws can have pins 32. The pins help break up materials that tend to clump together.

For food products, it has been found particularly desirable to have the lower screw with an outside diameter in the range of between about one inch and about four inches. For raisins, it has found particularly good to have this diameter at two inches. It is preferred that the upper screw 30 be larger than the lower screw 21. Desirably, the upper screw 30 diameter should be in the range of between about 2 and about 5 inches. It is particularly desirable for depositing raisins that the upper screw 30 diameter be approximately 4 inches. Preferably, the diameter ratio of the lower screw 21 to the upper screw 30 is in the range of between about 1:1 and about 1:3. It is particularly desirable to have the screw diameter ratio of 1:2 for the depositing of raisins.

As seen in the figures, there is a gap between the outer diameter of each of the screws and sidewalls and between the shafts 33 and 34 of the screws 21 and 30, respectively, and their respective side walls of the hopper. It is preferred that with the lower screw 21 that the gap A between the shaft and the wall be in the range of between about ¼ inch and about one inch with a preferred spacing for raisins being ¾ inch. For the upper screw 30, the gap B is preferred to be in the range of between about ¾ inch and about 1½ inch with a preferred gap B for raisins being 1¼ inch. It is also preferred that the ratio of the gap A to B be in the range of about 1:1 to about 1:2.

Depending upon the particular type of material being deposited, the gap C and D between the screw flights and the side walls be in the range of between about 1/16 inch and about ½ inch and more preferably in the range of between about 1/8 inch and about ¼ inch. In general, the smaller the particulate, the smaller the gap one can use without damaging the particulates during depositing.

Also, depending upon the type of particulates being deposited, the screws 21 and 30 have a pitch in the range of between about one inch and about four inches and preferably for the depositing of raisins, the pitch is two inches. Also, it is preferred that during operation, that both screws 21 and 30, rotate simultaneously in the same direction and that the pitch also be in the same direction. However, other ranges can also be used. The screws 21 and 30 can have a length up to 60 inches or even more to provide depositing over very long distances.

It is preferred that the side walls 11 and 12 be sufficiently high to provide a head over the top of the upper screw 30 in excess of four inches and for foods it is desired that the head be less than about 14 inches. Higher walls for the hopper could be provided so long as the head of material contained in the hopper is maintained within appropriate ranges.

With regard to the screen 20, the size and shape of the openings 36 will be dependent upon the material to be deposited. Preferably, the holes are round and have a diameter in the range of between about ⅛ inch and about one inch. It has been found that numerous materials can be accurately deposited with ½ inch diameter openings.

The drive means can be any suitable drive means effective to suitably drive the screws 21 and 30. In a preferred embodiment, the screws 21 and 30 simultaneously rotate in the same direction and oscillate or reverse direction at pre-selected intervals of rotation. Continuous rotation of the screws in one direction tends to damage the product. In the form of the invention shown, the drive means 4 includes a drive actuator 38 which is connected through suitable drive means to each of the screws 21 and 30 to effect their rotation. As shown, the drive actuator is a rotary actuator which is an air cylinder 39 with a rack and pinion drive connected to an output shaft in one direction of travel of the cylinder, the shaft rotates in one direction and on reverse movement of the cylinder, the shaft rotates in the opposite direction. The drive actuator 38 is connected to the screws 21 and 30 by a shaft 41. The shaft 41 has mounted thereon a sprocket which in turn is connected to the shafts of the screws 21 and 30 via sprockets 42 and a chain 43. In the form shown, operation of the drive actuator 38 rotates both shafts simultaneously in the same direction, both in forward and reverse directions. Speed of the drive actuator and hence the rotational speed of the screws 21 and 30, can be controlled as is known in the art by restricting the exhaust ports of the cylinder 39. In the illustrated form of the invention, this can be simultaneously accomplished by having a respective control valve 70 or 71 connected to each of the exhaust ports of the cylinder 39. The valves 70 and 71 can be connected together via sprockets and a chain 45 and 46, respectively. By having the valves 44 variable, restriction is also variable and therefore the operating speed of the cylinder 39. It is preferred that the rotational speeds of the screws be in the range of between about 20 rpm and about 200 rpm and preferably in the range of between about 40 rpm to about 140 rpm.

The lower screw 21 and screen member 20 cooperate in a manner such that particulates are fed or deposited along the length thereof and not from the end of the screw as in typical screw feeders.

The drive means further includes control means for effecting rotational reversal and as shown, that includes cam members 48 and 49 mounted on the shaft 41. During rotation, the cam members actuate limit switches 50 and 51, respectively, which in turn control the solenoid valve 67.

For foods, it is believed that no more than about three revolutions of the screws 21 and 30 should be made before reversal. It has been found particularly desirable to have the screws rotate approximately one revolution before reversing.

Although not shown, it is to be understood that the drive actuator 38 can be timed for on/off sequencing for spot depositing rather than continuous depositing. Further, funnel members can be placed underneath the screen 20 to have the particulates deposited in multiple strips rather than one continuous curtain across the width of the hopper. The two above can be combined for spot depositing in multiple strips.

In order to provide safe operation, the depositor 1 can be provided with guards 52 and 53 at the depositing area. Microswitches 54 are mounted on the depositor 1 and are operative to electrically show that the guards 52 and 53 are opened or closed to form the interlocks. Likewise, the top grate or guard 56, which is hingedly mounted in the upper portion of the conveyor, can also have an interlock switch 57. As seen, the interlock microswitch 57 is mounted on an end wall of the hopper and the pivot pin (hinge) of the upper guard 56 extends thru the wall with an eccentric member to actuate the switch 57. Further, interlocks 57 and 54, respectively, can also be provided which cooperate with the guards 52 and 53 whereby upon opening of any of the guards the depositor 1 is disenabled and will not operate. Such safety features are known in industry.

Figure 5:
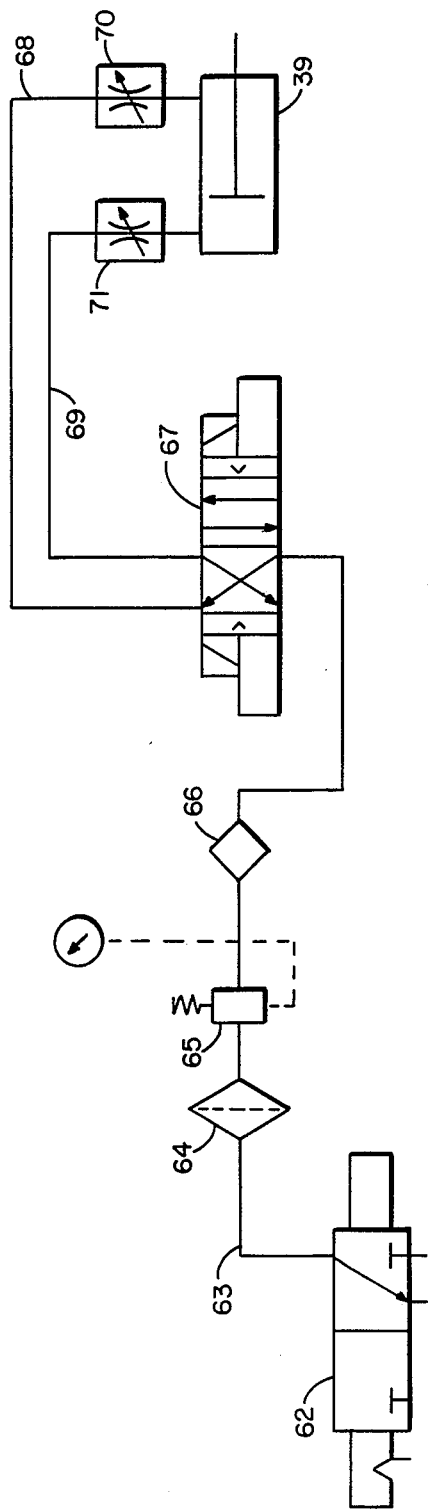

FIG. 5 shows a schematic diagram for the air supply system. As shown, air enters the system via a 3-way valve 62. By switching the valve from the position shown, air can also be exhausted to deactivate or depressurize the system. The valve 62 is connected via conduit means 63 thru a filter 64, pressure regulator 65 and a lubricator 66, to a 4-way, pilot-operated solenoid valve 67. The conduit means 63 then includes two conduits 68 and 69, each having connected therein, respective flow control valves 70 and 71 which are in turn, connected to the cylinder 39.

Figure 6:
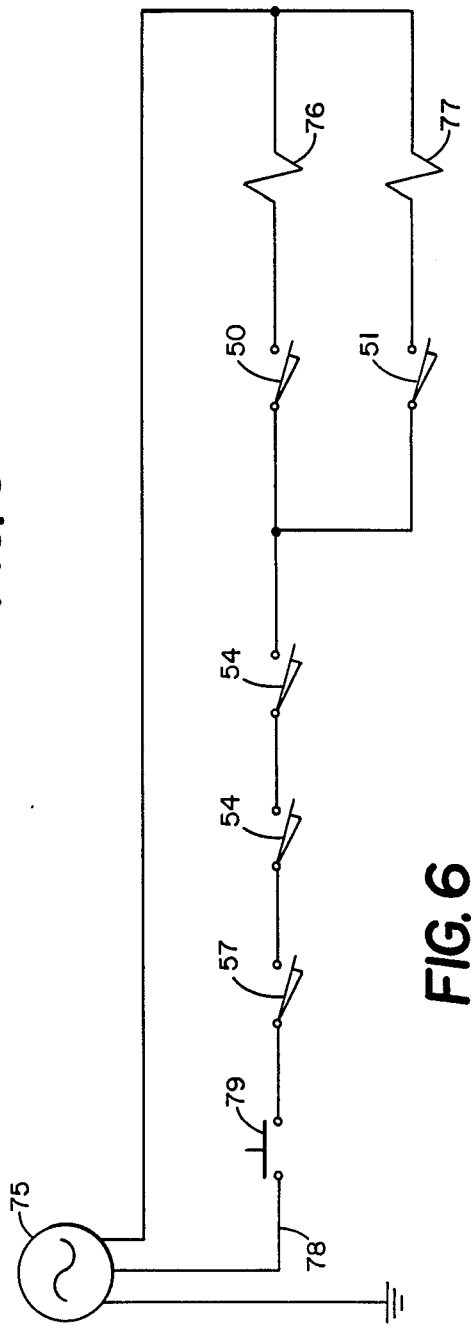

FIG. 6 shows the electrical schematic for the depositor 1. As shown, a source of electricity 75 is electrically connected to solenoids 76 and 77 of the valve 67. As shown, one of the conductors 78 has connected therein a plurality of series connected switches. The first switch 79 is the main on/off switch and is manually operated; then in series are the switch 57 and two switches 54. Theses microswitches are interlocks and prevent the system from being activated in the event one or more of the guards is not in a closed position. As seen, the switches 50 and 51 and their respective solenoids 76 and 77 are connected in parallel to provide for separate operation of the respective solenoids.

A depositor as described above was made with the hopper having a length of 48 inches, screen hole diameters of ¼ inch with dead spaces of approximately two inches at each end of the screen. A lower screw with a two inch pitch and a two inch diameter with a gap A of ¾ inches and a gap C of ¼ inch and an upper screw having a diameter of four inches and a gap B of 1¼ inches and a gap D of ¼ inches and a total included wall angle of 36° was operated. It was observed visually that the operation of this hopper produced an extremely uniform distribution of raisin which required only washing to effect.

From the foregoing, it is seen that a depositor is provided which provides both versatility, portability and effective operation for a variety of materials. A particularly described depositor which was built provided exceptionally good depositing results on nutmeats, ground nutmeats, raisins, toasted coconut and the like. It provided operating results better than any known food depositor including vibrator trays, oscillating grates and screw feeders which feed particulates out the end of the screw instead of the side of the screw as is done by the present invention. Depositing with the present invention resulted in the ability to deposit particulates without destroying or damaging their texture, provide a uniform distribution both by weight with time and across the width of the depositor. Further, the present depositor is not only versatile and portable, but is inexpensive to manufacture.

It is to be understood that while the present invention has been described in reference to certain types and arrangements of components the present invention is not to be limited thereto except to the extent that such limitations are found in the claims.

What is desired to be secured by Letters Patent is:

1. An apparatus for depositing particulate materials, said apparatus comprising: a hopper means having an inlet opening and a lower disposed outlet;
    a perforate member positioned adjacent said outlet;
    a plurality of feed screws positioned in said hopper means adjacent said outlet with the said plurality of screws being in generally superposed relationship, said plurality of screws including at least a first screw and a second screw with said first screw being positioned lower in said hopper than said second screw; and
    drive means operably connected to said first and second screws to effect rotation thereof, said drive means being such as to automatically and intermittently reverse the direction of rotation of at least said first screw at preselected intervals.

2. An apparatus as set forth in claim 1 wherein: said drive means is effective to intermittantly reverse said first and second screws.

3. An apparatus as set forth in claim 1 or 2 wherein: said drive means is effective to intermittently reverse the direction of rotation less than about every three revolutions.

4. An apparatus as set forth in claim 1 or 2 wherein: said perforate member has imperforate sections at opposite ends, thereof, adjacent opposite ends of said first screw.

5. An apparatus as set forth in claim 1 or 2 wherein:

the outer diameter of said first screw is in the range of between about one inch to about four inches and the outer diameter of said second screw is in the range of between about two inches and about five inches.

6. An apparatus as set forth in claim 5 wherein:
the ratio of the diameter of the first screw to the second screw is in the range of between about 1:1 and about 1:3.

7. An apparatus as set forth in claim 5 wherein: the gap A of the first shaft is in the range of between about ¼ inch and about one inch and the gap B of the second screw is in the range of between about ¾ inch and about 1½ inch and the gaps C & D of the first and second screws respectively, are in the range of between about 1/16 inch and about ½ inch.

8. An apparatus as set forth in claim 1 or 2 wherein:
said drive means being effective to provide a rotational speed for said first screw in the range of between about 20 rpm and 200 rpm.

* * * * *